United States Patent [19]
Burg

[11] Patent Number: 5,000,107
[45] Date of Patent: Mar. 19, 1991

[54] EXTENDED BOW AND MULTIPLE AIR CUSHION AIR RIDE BOAT HULL

[76] Inventor: Donald E. Burg, 15840 SW. 84th Ave., Miami, Fla. 33157

[21] Appl. No.: 458,575

[22] Filed: Dec. 29, 1989

Related U.S. Application Data

[63] Continuation-in-part of Ser. No. 237,403, Nov. 1, 1976, abandoned, and a continuation-in-part of Ser. No. 818,303, Jul. 25, 1977, Pat. No. 4,165,703, and a continuation-in-part of Ser. No. 69,771, Aug. 27, 1979, abandoned, and a continuation-in-part of Ser. No. 207,789, Nov. 17, 1980, abandoned, and a continuation-in-part of Ser. No. 269,908, Jun. 3, 1981, Pat. No. 4,392,445, and a continuation-in-part of Ser. No. 289,769, Aug. 3, 1981, abandoned, and a continuation-in-part of Ser. No. 343,287, Jan. 27, 1982, abandoned, and a continuation-in-part of Ser. No. 458,738, Jan. 17, 1983, abandoned, and a continuation-in-part of Ser. No. 465,670, Feb. 10, 1983, abandoned, and a continuation-in-part of Ser. No. 584,728, Feb. 29, 1984, Pat. No. 4,587,918, and a continuation-in-part of Ser. No. 844,529, Mar. 27, 1986, Pat. No. 4,735,164, and a continuation-in-part of Ser. No. 862,300, May 12, 1986, Pat. No. 4,739,719, and a continuation-in-part of Ser. No. 183,588, Apr. 19, 1988, Pat. No. 4,890,564.

[51] Int. Cl.⁵ .................................................. B63B 1/38
[52] U.S. Cl. ..................... 114/67 A; 180/126
[58] Field of Search ............... 114/67 A, 285, 286, 114/287, 289, 290; 180/126, 127, 128

[56] References Cited

U.S. PATENT DOCUMENTS

| | | | |
|---|---|---|---|
| 3,027,860 | 4/1962 | Priest | 114/67 A |
| 3,146,752 | 9/1964 | Ford | 114/67 A |
| 3,518,956 | 7/1970 | Girodin | 114/67 A |
| 3,742,888 | 7/1973 | Crowley | 114/67 A |
| 4,046,217 | 9/1977 | Magnuson | 114/67 A |

Primary Examiner—Sherman Basinger
Attorney, Agent, or Firm—Robert J. Van Der Wall

[57] ABSTRACT

An improved performance marine surface vessel that includes a pressurized gas cavity in its underside that is restrained by hull structure and hull seals supports some 80 to 90 percent of vessel weight which results in much greater hull efficiencies. The gas cushion is normally supplied with pressurized gas by mechanical apparatus such as a powered blower. Significant advancements include multiple seals placed in the gas cushion to divide its functions, use of differential gas cushion portion pressures to provide quality improvements, zero and/or low angle to horizontal surfaces on sidehull forward lower and/or aft seal lower surfaces insures good gas sealing and maximum hull efficiencies, aft seal angled surfaces and forwardly extending bow provide good ride qualities in a seaway, a seal divider member passes through seals thus adding to hull strength and providing separation of gas cushion portions, and controllable aft movable seal members provide a way to control gas cushion and therefore hull orientation. Other features include a hollowed out underside of a seal divider and steps in lower hull surfaces to minimize wetting area drag of the divider, a way to easily install and remove seal elements with the hull waterborne, and a narrower hull beam forward than aft which results in more attractive and easier riding bow sections. The above advancements may be used singularly or in various combinations.

142 Claims, 3 Drawing Sheets

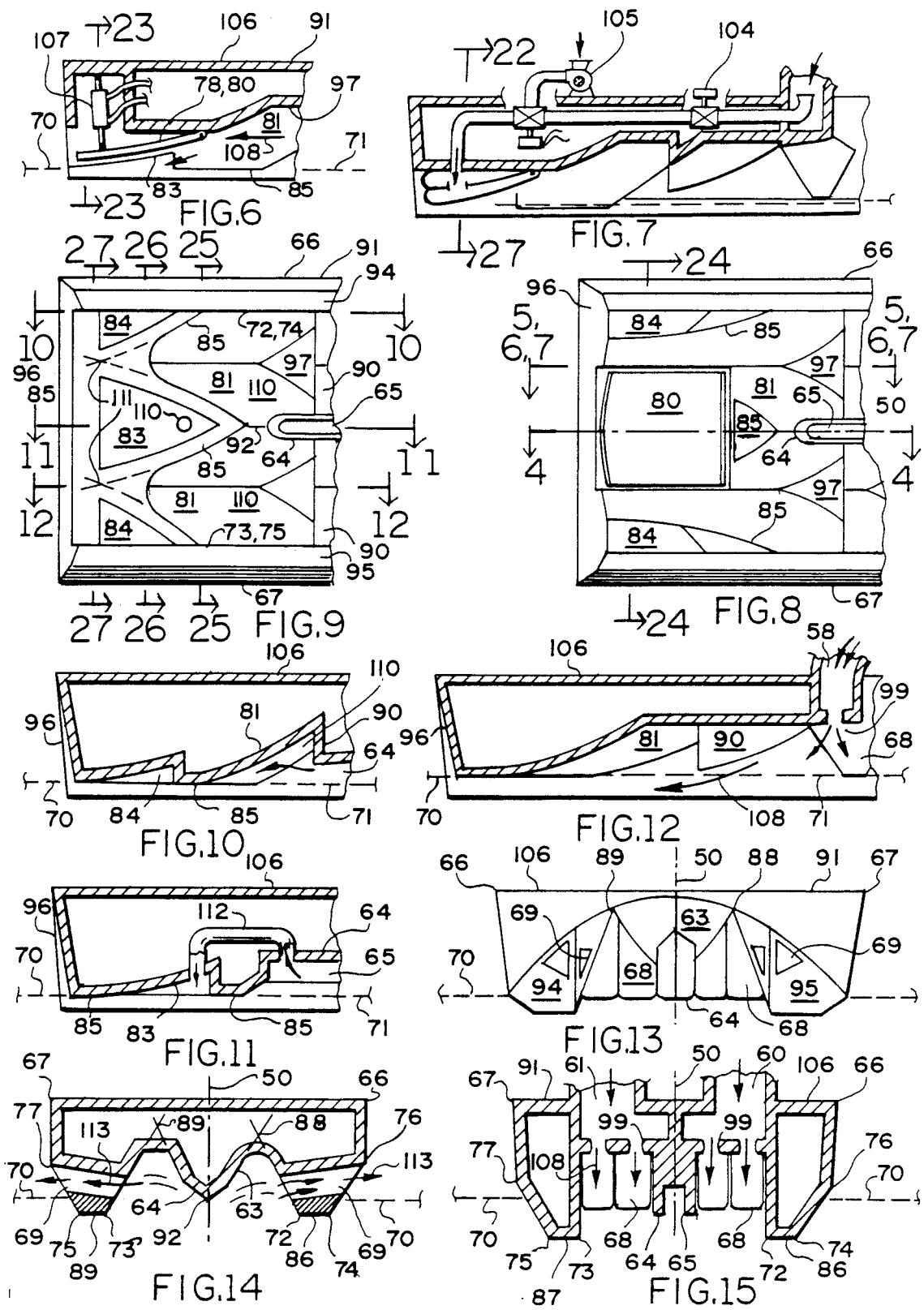

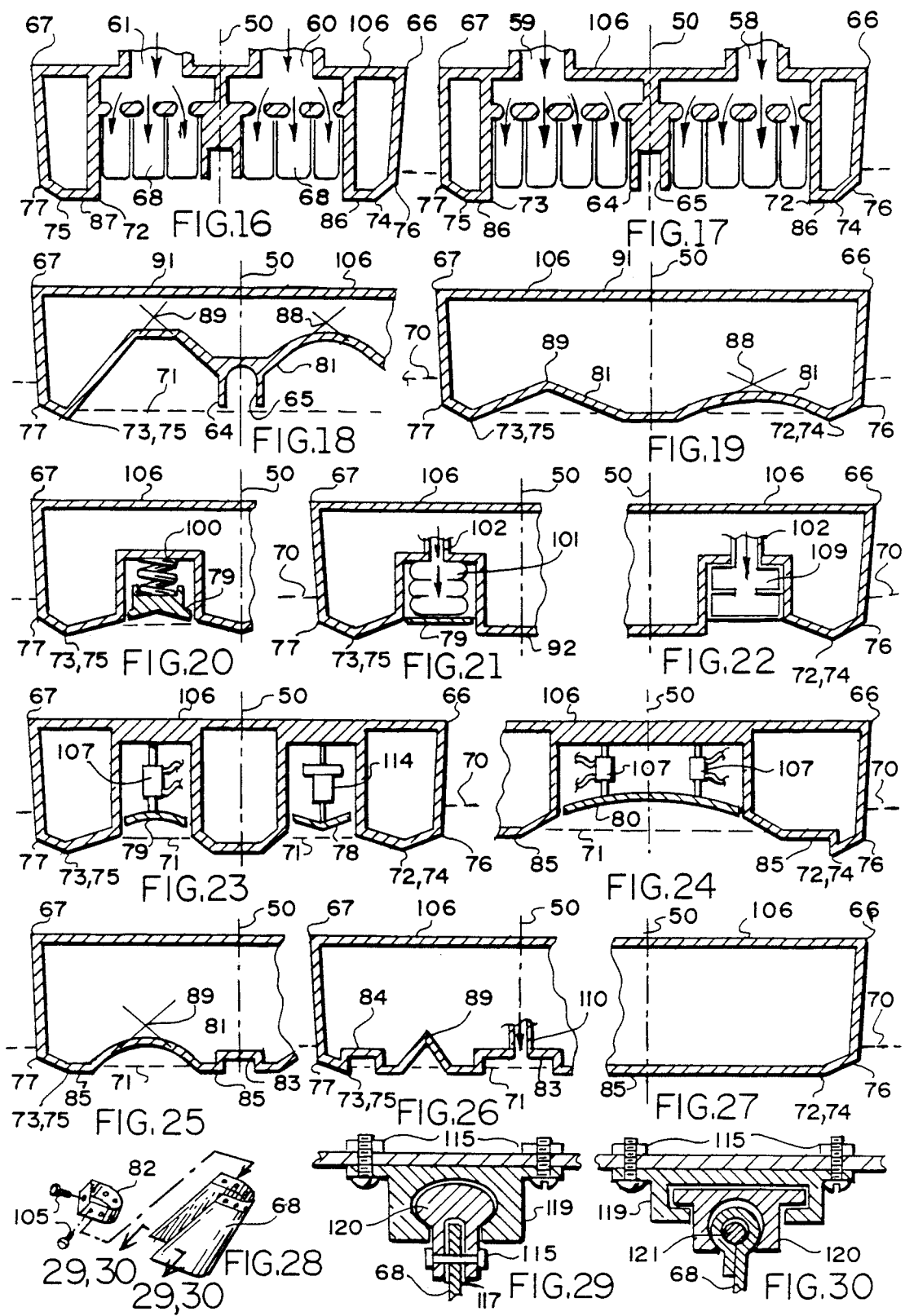

EXTENDED BOW AND MULTIPLE AIR CUSHION AIR RIDE BOAT HULL

CROSS REFERENCE TO OTHER APPLICATIONS

This application is a continuation-in-part to applicant's earlier applications, Ser. No. 737,403 filed Nov. 1, 1976, now abandoned; Ser. No. 818,303 filed July 25, 1977, now U.S. Pat. No. 4,165,703 issued Aug. 28, 1979; Ser. No. 069,771 filed Aug. 27, 1979, now abandoned; Ser. No. 207,789 filed Nov. 17, 1980, now abandoned; Ser. No. 269,908 filed June 3, 1981, now U.S. Pat. No. 4,392,445 issued July 12, 1983; Ser. No. 289,769 filed Aug. 3, 1981, now abandoned; Ser. No. 343,287 filed Jan. 27, 1982, now abandoned; Ser. No. 458,738 filed Jan. 17, 1983, now abandoned; Ser. No. 465,670 filed Feb 10, 1983, now abandoned; International Application No. PCT/US 83/010 067 filed July 11, 1983 now WO 85/00332; Ser. No. 584,728 filed Feb. 29, 1984, now U.S. Pat. No. 4,587,918 issued May 13, 1986; Ser. No. 844,529 filed Mar. 27, 1986, now U.S. Pat. No. 4,735,164 issued Apr. 5, 1988; Ser. No. 862,300 filed May 12, 1986, now U.S. Pat. No. 4,739,719 issued Apr. 26, 1988; Ser. No. 183,588 filed Apr. 19, 1988, now U.S. Pat. No. 4,890,564 issued Jan. 2, 1990; and International Application No. PCT/US 89/01421 filed Apr. 6, 1989 now WO 89/10294.

FIELD OF THE INVENTION

This invention relates to the field of marine surface vessels supported at least in part by a pressurized gas cushion where the pressurized gas is supplied to the cushion primarily by artificial means. The pressurized gas cushion is restrained, at least partially, by a recess built into the underside of the hull with particular improvements relating to a forwardly extending bow member that helps lift the bow over rough seas, water impact relief and air pressure vent ports in the side hulls, actively controlled movable stern seal member sections that allow adjustment and control of recess gas cushion height, pressure pulses, and the like, resiliently biased movable stern seal members that allow water surface following by the movable stern seal member and therefore better gas cushion sealing, horizontal or near horizontal surfaces on sidehull lower sections near the bow and/or on the lower sections of the stern seal which insures better gas cushion sealing and adds to vessel stability and efficiency at high speeds, diverging sidehull keels that allow a narrower entry or bow on the hull and resultantly provide a better ride, and fixed and/or movable seals dispersed in the gas cushion that divide the main cushion into separate portions so that the separate gas cushion portions can be supplied with gas at different pressures to aid in vessel trim and roll control and such gas cushion portions can also can be vented of pressure peaks independently of each other.

BACKGROUND OF THE INVENTION

The instant invention is a further improvement to applicant's earlier inventions in this field that are generally entitled "Air Ride Boat Hulls". All of these inventions require the introduction of pressurized gas into a recess in the underside of the boat hull to improve operating speeds and load carrying capabilities due to increased efficiencies, provide superior ride qualities, and provide improved stability.

Much of the background for the current invention is discussed in some detail in applicant's earlier U.S. Pat. Nos. 4,392,445, 4,587,918, 4,739,719, and 4,890,564. The instant invention offers significant advancements over the just mentioned U.S. Patents of applicant. These advancements are discussed in some detail in the following sections.

SUMMARY OF THE INVENTION

The object of the instant invention is to offer the advantages of previous Air Ride boat hull concepts, as discussed in U.S. Pat. Nos. 4,392,445, 4,587,918, 4,739,719, and 4,890,564, coupled with further improvements in stability including particularly roll and pitch stability improvements allowed by seals placed in the gas cushion to divide its functions, ride quality by allowing differential chamber pressure control in the different gas cushion portions formed by the seals in the gas cushion, zero and/or low angle to horizontal surfaces on lower sidehull surfaces forward and/or on lower portions of the gas cushion stern seal where such low angle surfaces provide stability and efficiency to the hull when operating at high speeds and also insure better gas cushion sealing, and movable stern seal members that can be resiliently biased to allow water surface following by the movable stern seal member and therefore provide better gas cushion sealing and/or controlled by mechanical means that allow setting of movable stern seal orientation thereby allowing adjustment and control of recess gas cushion height, orientation, and/or pressure pulses.

A further object of the invention is to provide a forward seal divider member that passes through the forward gas seal which is substantially moveable which respect to said hull thus adding to hull structural integrity as well as helping divide the gas cushion while offering minimum additional wetted area drag since it may have its water contacting underside open at the bottom.

It is also a feature of the invention to allow the forward seal divider member to start forward of the forward movable seal and be at a lower elevation than the lower side of the forwardly extending bow member. This allows the lower surface of the forward bow member to be well above the water surface in all but rougher seas since the only forward water contacting surfaces are on the lower portions of the generally narrower seal divider member.

A further feature of the instant invention involves the use of air pressure and wave impact venting openings located in the sidehulls. These openings allow the venting of the pressurized air that builds up forward of the movable bow seal and adds to vessel drag. The vents also allow water wakes and/or water spray that is shed by the forward bow to escape without impacting the sidehulls in the area of the vents. The latter feature not only reduces wave impact forces but also reduces sidehull wetted area friction drag effects.

Another feature of the present invention is to provide for expanding or diverging sidehulls which allows for a narrower hull entry forward and resultant better ride qualities. This feature can be combined with the use of more than one movable seal so that sidehull divergence takes place aft of one or more of such movable seals and therefore allows a better shaping of the sidehulls for minimum hull resistance.

A further feature of the design is to be able to have on-board personnel remove movable seal elements with the hull waterborne. This is particularly valuable for movable seals other than the most forward seal since the hull would definitely have to be dry docked for seal changing without this feature. Further, a second or recessed seal could not be inspected for damage without the drydocking of the vessel except in the case of the instant invention.

Yet other features of the movable seals are alternate means to slide the seals into tracks in the hull. These are basically simple variations of the attachment means presented in my earlier inventions but are presented to show some of the seal attachment variations possible.

The invention also presents the feature of using different pressures in the different gas cushion portions formed by multiple gas cushion seals where the different pressures can be supplied by simply using separate blowers or by directing pressure from different discharge portions of a blower to separate gas cushion portions. It is also possible, with the instant invention, to vent pressure peaks from independent gas cushion portions to insure best ride qualities.

Another feature of the invention is the use of steps in otherwise horizontal or low angle to horizontal stern seal portions where such steps provide a means to break the water from wetted surfaces and therefore reduced wetted area hull drag.

Yet another feature of the invention is to provide a stern seal that has, at least partially, an inverted-V shape in its forward portions that transitions into a horizontal or low angle to horizontal shape proximal its aft portions. When one of these inverted-V shaped gas cushion aft seal portions runs into a horizontal or near horizontal surface as it goes aft, the result is a generally V-shape or U-shape when viewed in a fish eye plan view of the hull. When two of these inverted-V shapes and the subsequent low angle aft shapes are combined the result is a W-shape, as viewed in a fish eye plan view of the hull. Either of these, or other variants of the concept, presents a good high efficiency aft planing surface and good gas pressure sealing for the gas cushion water interface or surface.

The invention will be better understood upon reference to the drawings and detailed description of the invention which follow in which:

BRIEF DESCRIPTION OF THE DRAWINGS

FIG. 3 shows the location of multiple sets of movable seals in the gas cushion where such movable seals can be of enlarging width as they go aft. Also shown are forward sidehull section and gas cushion aft seal horizontal or low angle lower surfaces and a step in same, movable gas cushion aft seal members, fixed seal member disposed between the aft seal and the forward movable seal, and sidehull vents or ports for venting air pressure that builds up forward of the forward seal and/or high energy water from the forward seal itself or from the forwardly extending bow member.

FIG. 6 presents a partial cutaway view taken through line 6—6 of FIGS. 1, 3, and 8. This shows an alternate actuator means for a movable stern seal member in the form of hydraulic, pneumatic, electro-mechanical, or similar device. Any of these devices can be position controlled and can also include a resiliently biased member, such as a spring, if desired.

FIG. 7 is a partial cutaway view taken through line 7—7 of FIGS. 1, 3, and 8. This is a similar concept to that shown in FIG. 5; however, the movable gas cushion aft seal member is composed of flexible members that are in direct water contact. It is therefore a simpler and more flexible but probably less durable seal design than the movable seal shown in FIG. 5.

FIG. 8 is a partial fish eye plan view of an alternate movable stern seal configuration that utilizes a single movable gas cushion after seal member. This single movable seal member offers the simplicity and lower maintenance of a single movable seal member but does not have as much roll control ability as the multiple movable stern seal members presented in FIG. 3.

FIG. 9 presents a partial fish eye plan view of a hull structure type gas cushion aft seal member that has horizontal or low angle to horizontal lower surfaces to increase gas cushion sealing efficiencies and to give a large aft planing area that increase hull stability and efficiency at high speeds. It is also possible to include recessed steps, such as the triangular sections shown in FIG. 9, that are deeper recessed forward and change to shallow aft at the base of the triangles to reduced the wetted area drag of the lower surfaces of this gas cushion aft seal design. The optional hole in the center triangle step area is actually an optional gas supply port that keeps the step area vented.

FIG. 10 is a partial cutaway view as taken through line 10—10 of FIG. 9 that shows the fixed gas cushion aft seal member which, in this case, has a horizontal lower surface with an integral step in such lower surface.

FIG. 11 is a partial cutaway view as taken through line 11—11 of FIG. 9. This hull centerline view shows horizontal gas cushion aft seal lower surfaces including an integral step in same, a gas supply line that feeds the step are, and the centerline divider including its optional hollowed out center section.

FIG. 12 presents a partial cutaway view as taken through line 12—12 of FIG. 9. This view shows the preferred gentle downward slope of the gas cushion aft seal in this preferred embodiment of the invention.

FIG. 13 is a frontal view of a boat hull to the inventive design as taken from line 13—13 of FIG. 3. This view shows the sidehull vents, for movable bow seal elements, a forwardly extending bow member, and a divider element attached to the underside of the forwardly extending bow on centerline.

FIG. 14 is a cutaway view as taken through line 14—14 of FIG. 3 sidehull vents positioned, at least in part, forward of the gas cushion forward movable seal. This figure also shows water spray vectors as they might also originate off the forwardly extending center bow and then be directed out the sidehull vents. Note the flat top surface of the inverted-V section on the port side and the rounded or U-shaped top surface on the starboard side in this view. Either of the two just mentioned or similar concepts are acceptable.

FIG. 15 is a cutaway view as taken through line 15—15 of FIG. 3 that shows four movable seal elements that make up the forward movable seal in this example. It also shows the pressurized gas inlets, center divider member with its hollowed out lower surface, and essentially horizontal sidehull lower surfaces.

FIG. 16 is a cutaway view as taken through line 16—16 of FIG. 3. This view shows the same basic elements as FIG. 15 but with six movable seal elements rather than the four of FIG. 15 which is due to the expanding or diverging sidehulls between sections or views 15—15 and 16—16.

FIG. 17 is a cutaway view as taken through line 17—17 of FIG. 3. This view shows the same basic elements as FIG. 15 but with eight movable seal elements rather than the four of FIG. 15 which is due to the expanding or diverging sidehulls between sections or views 15—15 and 17—17.

FIG. 18 is a cutaway view as taken through line 18—18 of FIG. 3 that shows a typical hull cross section in the area of the gas cushion. Note the center divider element that is hollowed out to reduce lower surface wetted area and the dual inverted-V shapes that preferably intersect below the deck line of the hull. This intersection of the inverted-V shapes is defined as occurring whether the hull surfaces physically intersect or do so only by intersection of extensions of hull surfaces as shown.

FIG. 19 is a cutaway view as taken through line 19—19 of FIG. 3. FIG. 19 intersects a section of the gas cushion aft seal member and shows a noticeably less deep section than that shown in FIG. 18. It should be noted that it is quite possible to terminate the hull at section 19—19 and still have an effective air ride boat hull with good ride qualities and good gas cushion sealing.

FIG. 20 is a partial cutaway view as taken through line 20—20 of FIG. 4. This shows a resiliently biased movable gas cushion aft seal member. The fact that it is resiliently biased, as is accomplished by the mechanical actuator spring shown in this instance, allows it to follow the water surface automatically with no active control inputs. The movable gas cushion aft seal member is angled on its underside in the form of an inverted-V in this instance to insure minimum wave impact forces.

FIG. 21 is a partial cutaway view as taken through line 21—21 of FIG. 5 that shows a movable gas cushion aft seal member that is both resiliently biased and controllable in position by an active control system. The two functions are accomplished by use of a gas bellows that can be positioned, by changing the pressure in the bellows, but that also yields in a resiliently biased way to wave forces on the underside of the aft seal member since the bellows are actually a form of gas spring. The actual movable seal member that is water contacting is actually a more or less flat or horizontal surface in the example shown here which give best gas sealing at the expense of some increased wave impact forces.

FIG. 22 is a partial cutaway view as taken through line 22—22 of FIG. 7 that shows a similar gas bellows system as shown in FIG. 21 but with the gas bellows itself actually in direct contact with the water surface. This system has all of the attributes of that presented in FIG. 21 except that it is simpler and more flexible on its underside thereby allowing better following of irregular water surfaces and better gas cushion sealing. It has the disadvantage of offering a seal that requires more maintenance due to the fabric or other flexible material underside.

FIG. 23 is a cutaway view taken through line 23-23 of FIG. 6. This shows a simple hydraulic, pneumatic, or similar actuator that drives the port side movable seal element and an electromechanical actuator on the starboard side. The functions of both actuators are essentially the same as they are both basically derivations of mechanical systems. Shown in this example are an inverted-V shaped member on the port side and a V-shaped member on the starboard side although in an actual boat the same shape would probably be used on both sides. Note also the lower essentially horizontal flat on centerline that angles off on each side. This offers a high efficiency planing surface while still providing a reasonably low wave impact section for this section of the aft end of the gas cushion.

FIG. 24 is a partial cross sectional view as taken through line 24—24 of FIG. 8. Shown is a single mechanically actuated movable seal member which is similar in operation to the movable seal member shown in FIG. 23; however, it is, of course, possible to utilize other force means such as shown, for example, in FIGS. 20, 21, or 22 also. FIG. 24 simply presents an alternative single aft movable seal member portion which is simpler and requires less maintenance than multiple aft movable seal members while offering less gas cushion control than the multiple members.

FIG. 25 presents a partial cross sectional view as taken through line 25—25 of FIG. 8. Starting from the port side, it includes a flat surface next to the sidehull keel, inverted-V forward portion of fixed gas cushion aft seal member, another low angle or flat surface inboard of the inverted-V shape, and a recess positioned both sides of the hull centerline that is actually part of an optional vented step.

FIG. 26 is a partial cutaway view as taken through line 26—26 of FIG. 9. This is simply a further aft section than that shown in FIG. 25 with additional features shown being an optional step next to the sidehull keel and an optional gas cushion vent that feeds a centerline step to insure gas in the step.

FIG. 27 is a partial cutaway view as taken through line 27—27 of FIG. 9. This figure shows an essentially horizontal or flat aftermost area of the aft gas cushion seal that provides a good gas sealing surface and makes for a stable platform. It is also possible to put some angle to horizontal in this surface when better wave impact ride qualities are necessary.

FIG. 28 presents a one version of a typical forward and/or intermediate movable seal element and a seal element top cap. These seal elements are easy to install and remove with the boat hull waterborne since the seal elements, in their preferred embodiment, slide into tracks that are attached to the hull.

FIG. 29 is a partial cross section, as taken through line 29-29 of FIG. 28, of a seal element side bead fastener and its means of attachment to the hull track. In this instance a side bead fastener is attached to a flexible seal sheet like member by bolts, rivets, or other means.

FIG. 30 is a partial cross section, as taken through line 30—30 of FIG. 28 that shows yet another alternative means to use a side bead fastener for fastening a seal to the hull. In this instance the seal portion slides into a T-shaped member that in turn slides into a track that is affixed to the hull. It should be noted that the seal side bead fastener refers to any means of connecting used on the side or near side of the seal element to fasten it to the hull.

DETAILED DESCRIPTION

With reference to each of the aforementioned figures in turn, and using like numerals to designate similar parts throughout the several views, a preferred embodiment and several alternative embodiments will now be described.

Figure 1:
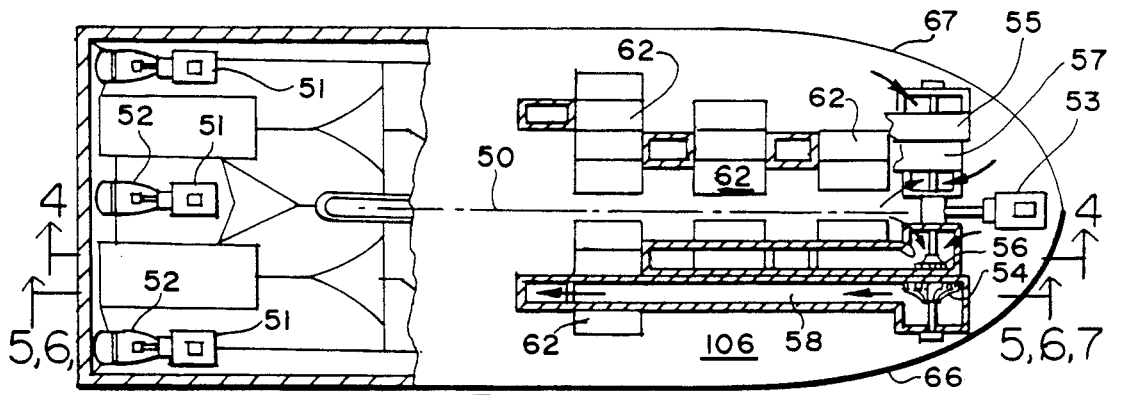
FIG. 1 presents a top partial cutaway view of a boat hull to the instant invention that shows typical engine and propulsor, waterjets in this example, installations and details of multiple powered blowers and their discharge ducts as they supply various gas cushion seal sections. The ducting is shown on the starboard side and the hull gas duct openings only are shown on the port side. Also shown are the covers on the seal removal openings in the hull.

FIG. 1 discloses the top partial cutaway view of a boat to the inventive hull 91 that shows a hull vertical centerline plane 50, st'bd sheer line 66, port sheer line 67, deck 106, main drive engines 51, waterjet propulsors 52, seal element removal openings 62, and blower drive engine 53. Details of the blower gas supply system include gas cushion main portion blower, st'bd 54 and port 55, gas cushion secondary portion(s) blower, st'bd 56 and port 56, gas cushion main portion supply duct, st'bd 58 and port 59, and gas cushion secondary portion(s) supply duct, st'bd 60 and port 61. Ducting on the st'bd side is cutaway and ducting on the port side is deleted for purposes of clarifying the figure. It is to be noted that use of separate blower sizes to supply different gas cushion portions allows different pressures in the different gas cushion portions.

Figure 2:
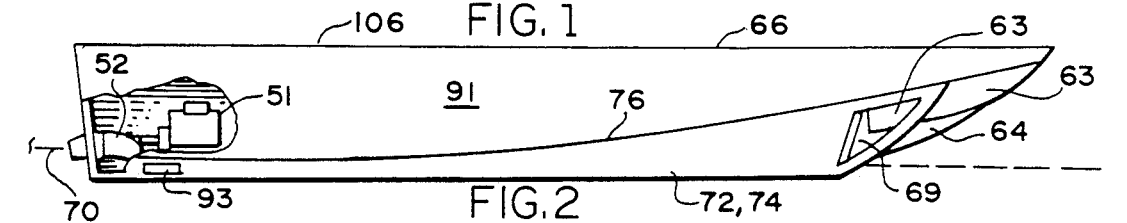
FIG. 2 shows a profile view of a preferred embodiment of the invention which includes an air pressure and wave impact vent on the forward portions of a sidehull. The seal divider element is shown on the lower portion of the forwardly extending bow which as a feature of this invention allows a wider or beamier forward bow to remain higher and thus not come into play except in higher seastates. Also shown are a drive engine and waterjet.

FIG. 2 presents a partial cutaway view of the inventive hull 91 in profile. Shown are the dynamic calm sea waterline 70, main engine 51, waterjet hull inlet 93, waterjet propulsor 52, st'bd sidehull 94, st'bd sheer line 66 which defines the deck 106 elevation, st'bd chine 76, st'bd sidehull keels, inner 72 and outer 74, stern or transom 96, forwardly extending bow 63, divider member 64, and sidehull vent 69. The divider member 64 normally intersects and is structurally bound to the forward bow 63. This adds to hull structural strength and also allows the forward bow 63 to be placed higher off the water surface 70 so that the forward bow 63 only comes into play in rough seas. The side vents 69 allow high energy water, as generated off the divider 64 and forward bow 63, and air pressure buildup to vent out the sidehull, st'bd 94, this venting, of course, reduces hull drag.

Figure 3:
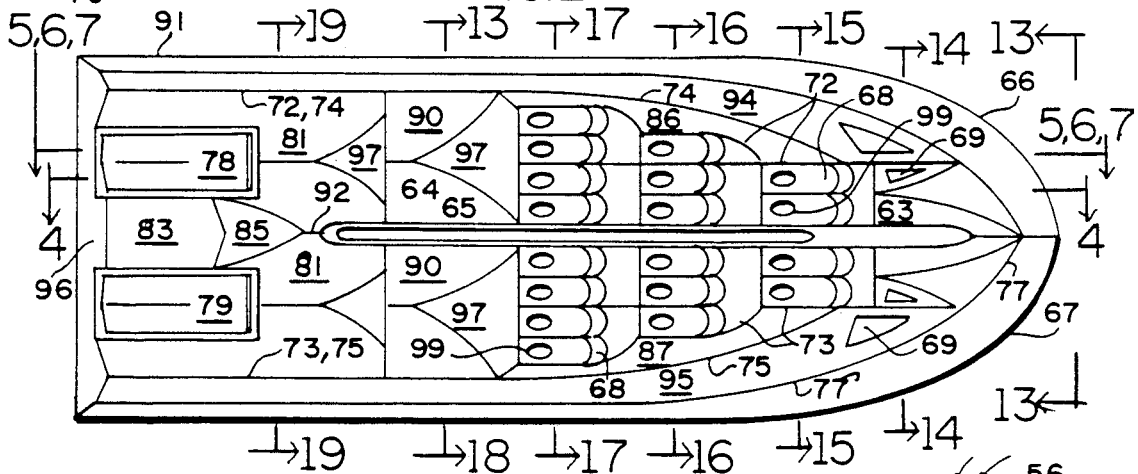
FIG. 3 presents a bottom or fish eye view of the preferred embodiment of the invention. Shown are the forwardly extending bow and its attached seal divider element that can extend aft to the stern seal. An optional part of this seal divider element is the gas cavity in its underside that reduces the amount of wetted area of the seal divider. Most importantly.

FIG. 3 is a bottom or fish eye view of the inventive hull 91. Shown are sheer line, st'bd 66 and port 67, sidehull chine, st'bd 76 and port 77, sidehull surface, st'bd 94 and port 95, sidehull outer keel, st'bd 74 and port 75, sidehull inner keel, st'bd 72 and port 73, sidehull lower more horizontal surface, st'bd 86 and port 87, and sidehull vents 69. Also shown are the stern or transom 96, upper recess surfaces 97, centerline keel 92, gas cushion aft fixed seal 81, aft fixed seal low to zero angle to horizontal surface 85, aft fixed seal surface step 83, gas cushion intermediate fixed bow shaped seal 90, movable stern seal members, st'bd 78 and port 79, divider member 64, divider member hollowed out portion 65, forward extending bow member 63, gas inlet openings 99, and movable seal elements 68.

Items of particular note in this figure are the three sets of movable seal elements 68 forward that are, in total, optionally successively wider or beamier going from forward to aft. The narrower beam forward allowed by the latter concept allows an attractive pointed bow design that also offers excellent ride qualities. The use of these seal elements 68, and optionally an intermediate fixed seal 90, divides the gas cushion into essentially separate longitudinal portions which allows for control of pressure in each separate portion. This pressure control can be accomplished by use of separate blowers, as seen in FIG. 1, or by other means such as venting with the result being a control of vessel trim and ride qualities since average and pulses of pressure in the different gas cushion portions can be controlled. The divider member 64 further facilities this division of the gas cushion as it does so in a transverse direction and therefore allows some element of roll stability. The divider member 64 may have a hollowed out portion 65 to reduce wetted area and therefore drag.

The forward sidehull zero to low angle to horizontal surfaces, st'bd 86 and port 87, provide a high efficiency hydrodynamic surface and stability forward while the aft zero to low angle to horizontal surface on the stern seal 85 provides similar benefits aft. The optional movable stern seal elements, st'bd 78 and port 79, offer better gas sealing and further control of hull and gas cushion orientation.

Figure 4:
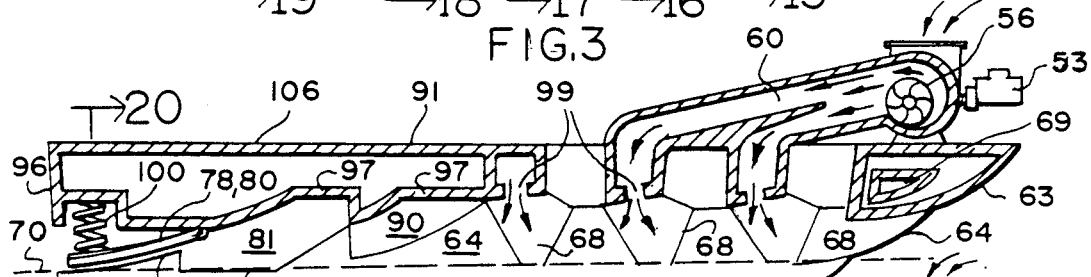
FIG. 4 is a cutaway view of the hull as taken through line 4—4 of FIGS. 1, 3, and 8. This shows a single blower supplying pressurized gas, at different pressures, to the two forward gas cushion portions. It also shows a resiliently biased, in this case accomplished by a spring, aft gas cushion seal movable member that is basically water following, a stp in a fixed portion in a gas cushion aft seal member, and a fixed intermediately located in the gas cushion bow shaped partial seal section.

FIG. 4 is a cutaway view of the hull 91 as taken through line 4—4 of FIGS. 1, 3, and 8. This shows the blower drive engine 53, smaller forward gas cushion portions blower 56, blower discharge duct 60 which is split in this case to allow higher pressure gas to the second gas cushion portion than the forward gas cushion portion, gas inlet ports 99, aft gas cushion portion st'bd inlet duct 58, and movable seal elements 68. Also shown are the calm sea waterline 70, gas cushion waterline 71, deck 106, divider element 64, forwardly extending bow 63, sidehull vent 69, upper recess surfaces 97, intermediate fixed seal 90, aft fixed seal 81, aft seal lower zero to low angle to horizontal surface 85, aft seal step 83, and aft moveable seal element, st'bd 78 and center 80. In this case, the aft movable seal element, st'bd 78 or center 80, is resiliently biased by a spring 100. The advantage of the resiliently biased seal element 78 is low cost and the ability to automatically cause the seal element 78 to follow the water surface 71 and therefore insure maximum gas sealing.

Figure 5:
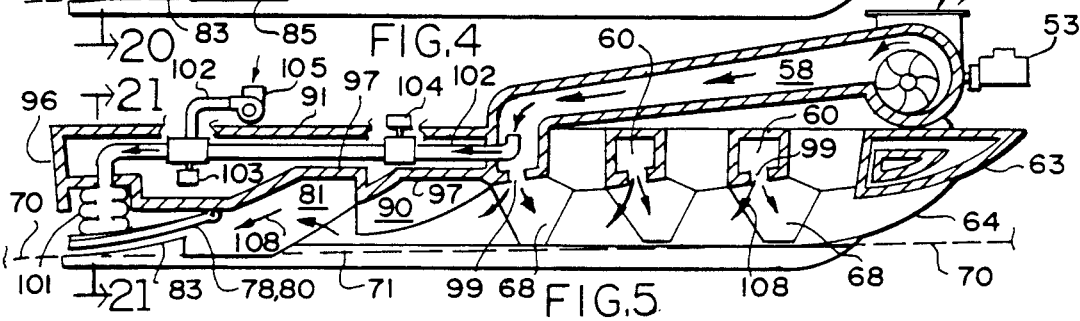
FIG. 5 is a cutaway view of the hull as taken through line 5—5 of FIGS. 1, 3, and 8. This shows a single larger blower that supplies pressurized gas to a main gas cushion portion and its discharge ducting and a gas bellows that controls movement and positioning of an aft movable seal member. This gas bellows allows not only positioning of the movable seal member but also provides a resiliently biased force so that the movable seal member can automatically follow the gas cushion water surface. The gas bellows can be sealed or provided with pressurized gas from a pickup in the blower discharge or from a separate blower as are shown as options in this figure. When gas is supplied by a blower it is common to have a vent, not shown, in the lower portion of the bellows that acts as a water drain.

FIG. 5 is a cutaway view of the hull 91 as taken through line 5—5 of FIGS. 1, 3 and 5. This is similar in concept to FIG. 4 just discussed except that is shows a larger blower 54 that supplies, through duct 58 and openings 99, pressurized gas to a main gas cushion portion. It should be noted that, although multiple gas cushion portions are desired, it necessary to have only one gas cushion portion for the instant invention to work. Also shown in this figure are seal elements 68, intermediate bow shaped fixed seal 90, aft fixed seal 81, lower aft seal zero to low angle to horizontal surface 85, aft seal surface step 83, upper recess surfaces 97, transom 96, calm sea waterline 70, gas cushion waterline 71, deck 106, forwardly extending bow 63, sidehull vent 69, and divider member 64.

FIG. 5 also shows an aft movable seal member, st'bd 78 and center 80, and its gas actuator bellows 101. In this example, the gas bellows 101 can be supplied with pressurized gas by blower 105 or by gas from a main blower duct 58 through gas line 102. Valves 103, 104 allow the selection of either supply source or the closing off of the supplies from the bellows 101 thereby making the bellows a closed sealed system. It is normally desirable to also include a water drain hole, not shown, in the bottom of the gas bellows. In any case, the bellows 101 acts as a gas spring only if sealed and, preferably, as a controlled position actuator and resiliently biased gas spring when supplied with gas at controlled pressures.

FIG. 6 shows an alternate movable aft gas cushion seal 78, 80 actuation means, in this case a pneumatic, hydraulic, electro, or the means powered actuator 107, in a partial cutaway view as taken through line 6—6 of FIGS. 1, 3, and 8. Also shown are the hull 91 deck line 106, transom or stern 96, aft fixed seal portion 81, divider member 64, flatter portion of aft seal 85, step 83, gas flow arrows 108, calm sea waterline 70, and gas cushion waterline 71. These type of actuators 107 generally are suitable for setting of movable stern seal elevation but do not function well when called upon to provide a resiliently biased function. It is, of course, possible to combine a spring, not shown, with these type actuators 107 to provide the resiliently biased function if desired.

FIG. 7 is a partial cutaway view, as taken through line 7—7 of FIGS. 1, 3, and 8 that shows a similar bellows type actuator 109 to that presented in FIG. 5. The difference is that there is no lower more rigid movable member as used in FIG. 5. The advantage of the rigid member is durability and less maintenance while the advantage of the system presented in this figure is better gas sealing in the transverse direction as the pure bellows seal is flexible in all directions to the water surface 71. Functions of the valves 103, 104, gas supply line 102, and bellows supply blower 105 are essentially the same as those described in the text regarding FIG. 5. Other items shown in this figure are transom 96, deck 106, gas supply duct 58, seal element 68, opening 99, divider 64, intermediate bow shaped member 90, aft fixed seal portion 81, and gas flow arrows 108.

FIG. 8 is a partial bottom or fish eye view that shows an alternate embodiment of the movable portion of a stern seal 80 which is a single element on centerline 92. This is a simpler less expensive system and, except for being limited in that it has less ability to control gas cushion functions than a dual movable aft seal element such as shown in FIG. 3, can use all of the same actuators and have the same advantages as the just discussed dual systems.

Also shown in FIG. 8 are the sheer lines 66, 67 transom 96, hull vertical centerline plane 50, aft seal member flatter portions 85, port and starboard aft seal member steps 84, aft fixed seal member 81, divider 64, and divider hollowed out portion 65.

FIG. 9 presents a partial bottom or fish eye view of an alternate aft seal version of the instant invention. This aft seal 81 includes forward surfaces 110 that are angled to horizontal, as seen in a vertical transverse plane of the hull, and that then become much flatter, zero to low angle to horizontal, on their lower surface 85. These more horizontal lower surfaces 85 provide good hull planing efficiencies and good gas sealing while the more angled to horizontal forward surfaces 110 provide sufficiently angled surfaces to give good ride qualities in rough seas when waves impact the stern seal 81. The more horizontal stern seal surfaces 85 optionally include steps 83 that act to reduce wetted area and hence hull drag. It is possible to supply gas to these steps through the gas port 110.

As can be seen, FIG. 9 also shows V-shapes and W-shapes as seen in this fish eye or bottom view of the hull 91. These shapes are actually defined by the intersection of the aft seal 81 forward surfaces 110 and more horizontal lower surfaces 85. Also shown are V-shape or W-shape peaks or intersections 111 that are defined by extensions of intersecting forward surface 110 and more horizontal lower surface 85 lines. Other items shown in FIG. 9 include a transom 96, sheer 66, 67, sidehull surfaces 94, 95, sidehull keels, st'bd 72, 74 and port 73, 75, recess upper surfaces 97, divider member 64, divider member hollowed out portion 65, and hull vertical centerline plane 50.

FIG. 10 presents a partial cutaway view, as taken through line 10—10 of FIG. 9, that shows a portion of the stern seal 81, forward more angled seal surface 110, lower more horizontal surface 85, step 84, intermediate bow shaped seal 90, transom 96, deck 106, calm sea waterline 70, and gas cushion waterline 71.

FIG. 11 is a partial cutaway view, as taken through line 11—11 of FIG. 9, that shows a centerline portion of a stern seal 81. Of particular interest in this view is the optional gas supply line 112 that supplies pressurized gas from the cushion to the step 84. Also shown in this figure is the deck line 106, stern 96, lower more horizontal surface 85, divider member 64, divider member hollowed out portion 65, calm sea waterline 70, and gas cushion waterline 71.

FIG. 12 is a partial cutaway view, as taken through line 12—12 of FIG. 9, that shows a section taken where side portion of forward angled surfaces 110 of aft seal 81 intersect. This figure also shows a deck line, intermediate bow member 90, seal element 68, gas duct 58, gas flow arrow 108, calm sea waterline 70, and gas cushion waterline 71.

FIG. 13 is a frontal view of the hull 91 as taken from line 13—13 of FIG. 3. Shown are the sidehull surfaces, st'bd 94 and port 94, sidehull vents 69, forwardly extending bow 63, divider member 64, seal elements 68, deck line 106, sheer, st'bd 66 and port 67, hull vertical centerline plane 50, and calm sea waterline 70.

FIG. 14 is a cutaway view of the hull 91 as taken through line 14—4 of FIG. 3. This figure shows water spray arrows 113, that are generated by the center bow 63 and divider 64, that then pass through vents 69 in sidehulls. Also shown are the sheers 66, 67, deck 106, main or centerline keel 92, sidehull inner keel, st'bd 72, 73, sidehull outer keel, port 74, 74, sidehull lower more horizontal surfaces, st'bd 86 and port 87, sidehull chine, st'bd 76 and port 77, and calm sea waterline 70. Note the inside surface inverted V-intersections, st'bd 88 and port 89, that are, in the preferred embodiment, disposed below the deck line 106 of the hull 91. It is a definition of this invention that these intersections 88, 89 can be actual physical intersections of hull surfaces or can be intersections of extensions of such surfaces and in either case they are considered to be inverted-V or V shapes as seen in a vertical transverse plane of the hull.

FIG. 15 is a cutaway view of the hull 91 as taken through line 15—15 of FIG. 3. This shows the most forward movable seal elements 64, gas inlet ducts 60, 61, openings 99, divider 64 with essentially parallel inside surfaces, hollowed out portion of divider 65, inner sidehull keels 72, 73, outer sidehull keels 74, 75, lower sidehull more horizontal surfaces 86, 87, sidehull chines 76, 77, sheers 66, 67, deck 106, gas cushion waterline 71, and calm sea waterline 70. It is important to note that the lower sidehull surfaces 86, 87 can be angled to horizontal where in such case the outer sidehull keels 74, 75 would preferably be at a higher elevation than the inner sidehull keels 72, 73.

FIG. 16 is a cutaway view of the hull 91 as taken through line 16—16 of FIG. 3 that shows essentially all of the same elements as were described in the discussion about FIG. 15 immediately preceding. The only difference is the addition of two additional seal elements 68 because of a divergence of sidehull keels 72, 73, 74, 75. Therefore, discussions of this figure are referred to the immediately preceding discussion of FIG. 15. Note that it is not necessary to have a sidehull keel divergence for the instant invention to function properly.

FIG. 17 is a cutaway view as taken through line 17—17 of FIG. 3. Since this is the same as FIG. 15 above and uses all of the same elements in the discussion, except for ducting 58, 58 and the use of two additional seal elements 69, the reader is referred to the preceding discussion of FIG. 15 to save redundancy in this text.

FIG. 18 is a partial cutaway view, as taken through line 18—18 of FIG. 3, that shows a typical hull 91 midship section. Shown are a hull vertical centerline plane 50, recess upper surface 97, divider member 64, divider hollowed out section 65, port side sidehull keels, inner 73 and outer 75, port side chine 77, deck 106, port side sheer 67, intersections of sidehull inside surfaces, st'bd 88 and port 89, and gas cushion waterline 71. Although only the preferred mainly planing type sidehull surfaces 95 are shown here for simplicity, other sidehull shapes including various displacement configurations to such extremes as torpedo shapes, narrow sideboards, and the like are also acceptable to the function and use of the instant invention.

FIG. 19 is a partial cutaway view, as taken through line 19—19 of FIG. 3. This view is taken through a further aft portion of the hull 91 than that presented in FIG. 18 and shows development of the aft seal member 81 into lower angles such that this section, 19—19, could actually be the termination of the hull, i.e. it would be the transom or stern, and the result would be an acceptable variation of the instant invention. FIG. 19 also shows sidehull keels 72, 734, 74, 75, sidehull chines 76, 77, sheers 66, 67, vertical centerline plane 50, calm sea waterline 70, and gas cushion waterline 71.

FIG. 20 is a port side partial cross sectional view, as taken through line 20—20 of FIG. 4, that shows the spring actuator 100 that provides resilient biasing to the movable stern seal member 79. Also shown are the centerline keel 92, vertical centerline plane 50, sidehull keels 73, 75, sidehull chine 77, sheer 67, deck 106, calm sea waterline 71, and gas cushion waterline 70. The underside of the movable seal member 79 is formed in an inverted-V shape in this structure; however, various other shapes, including horizontal are quite acceptable to the function of the invention.

FIG. 21 is a port side partial cross sectional view, as taken through line 21—21 of FIG. 5, that shows the gas bellows actuator 101 that provides position control and resilient biasing to the movable stern seal member 79. Also shown are the centerline keel 92, hull vertical centerline plane 50, deck 106, sheer 67, chine 77, sidehull keels 73, 75, bellows gas supply line 102, and calm sea waterline 70.

FIG. 22 is a st'bd side partial cross sectional view, as taken through line 22—22 of FIG. 7. This is essentially the same arrangement as that presented in FIG. 21 except the gas bellows 109 is the actual water contacting member. Also shown in this Figure are the hull vertical centerline plane 50, deck 106, sheet 66, sidehull chine 76, sidehull keels 72, 74 and calm sea waterline 70.

FIG. 23 is a cross sectional view, as taken through line 23—23 of FIG. 6, that shows movable aft seal members, st'bd 78 and port 79, and their actuators, st'bd 114 and port 107. In this example the st'bd member 78 is V-shaped, the port member 79 is inverted-V shaped, the st'bd actuator 114 is an electromechanical device and the port actuator 107 is shown as a hydraulic or pneumatic device. The electromechanical device is considered as mostly mechanical in function for purposes of description in this application since it is mostly mechanical in function. Also shown in the Figure are the deck 106, hull centerline plane 50, aft horizontal surface 85, sidehull keels 72, 73, 74, 75, sidehull chines 76, 77, sheers 66, 67, and gas cushion waterlines 71.

FIG. 24 is a partial st'bd side cross sectional view, as taken through line 24—24 of FIG. 8, that shows a single center mounted movable aft seal member 80 that is positioned by actuators 107. The actuators for this center movable aft seal 80 can be any of the various actuator types shown elsewhere in this application or may, indeed, be other variants of actuator. Other items shown in this Figure include deck 106, centerline plane 50, sheer 66, chine 76, sidehull keels 72, 74, aft seal horizontally oriented surfaces 85, and gas cushion waterline.

FIG. 25 is a partial port side cross sectional view, as taken through line 25—25 of FIG. 9. This Figure shows a forward section of the fixed aft seal member 81. Shown are the, in this example, horizontally oriented surfaces 85, center step 83, sidehull keels 73, 75, sidehull chine 77, sheer 67, deck 106, vertical centerline plane 50, inverted-V intersection 89, calm sea waterline 70, and gas cushion waterline 71.

FIG. 26 is a partial port side cross sectional view, as taken through line 26—26 of FIG. 9 that is just aft of FIG. 25 and shows further seal 81 development aft. This shows all of the elements described in FIG. 25 so the description of those items will not be repeated here. An addition is the step 84 positioned proximal the port sidehull keels 73, 75 that reduces wetted area drag values.

FIG. 27 is a partial st'bd side cross sectional view, as taken through line 27—27 of FIG. 9 that is further aft on the fixed stern seal 81 than FIGS. 25 and 26. This view shows an aft, in the example shown, horizontal seal surface 85, sidehull keels 72, 74, sidehull chine 76, sheer 66, deck 106, hull vertical centerline plane 50, and calm sea waterline 70.

FIG. 28 is an expanded isometric view that shows a forward movable seal element 68, optional seal top cap 82, and fasteners 115. The seal is normally attached along its backside by some mechanical attachment means examples of which can be seen in FIGS. 29 and 30.

FIG. 29 is a cross sectional view, as taken through 29—29 of FIG. 28. This Figure shows a portion of the seal element 68, optional backing 117, fastener 115, seal mechanical side bead fastener or male track 120, hull female track 119, hull fasteners 115, and hull structure 118. Other side fastener systems, including reversal of the male and female positions shown here, are considered within the scope of the instant invention so long as they affix portions of the movable seal 68 to the hull structure 118.

FIG. 30 is a cross sectional view, as taken through 30—30 of FIG. 28. This view simply shows another possible seal 68 side fastening means. This includes a portion of the seal 68 wrapped around a center core 121 where such seal side bead slides into a track member 120 which in turn slides into a hull track 119. The hull track is affixed to the hull structure 118 by fasteners 115.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by appended claims, which are the sole definition of the invention.

What I claim is:

1. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a forward movable seal, and with sidehulls that extend over at least a portion of a length of said hull, the improvement comprising:

inside surfaces of said sidehulls that are substantially parallel over at least part of their forward portions that are proximal the forward movable seal, said sidehull inside surfaces expanding outwardly, at least in part, aft of said parallel forward portions, and said sidehulls, outward of said parallel inside surfaces proximal said forward movable seal, having lower surfaces that are substantially more horizontal, as viewed in a vertical transverse plane of the hull, than an average angle of sidehull surfaces that are outward of said lower surfaces.

2. The hull of claim 1 with said sidehull having lower surfaces are positioned, at least in part, within a boundary formed by sidehull inner and outer keels.

3. The hull of claim 1 wherein said forward movable seal can be removed, at least in part, by on-board personnel through a hull opening disposed, at least in part, directly forward of said forward seal and wherein there is hull structure proximal to and, at least in part, directly forward of said hull opening.

4. The forward movable seal of claim 1 wherein said forward movable seal includes a mechanical fastener whereby said mechanical fastener slides into a track where said track is in mechanical communication with the hull and extends over a length of a rear portion of said seal.

5. The hull of claim 1 which further includes a second movable seal disposed aft of said forward movable seal, said seals forming part of a boundary of a forward gas cushion portion where said forward gas cushion portion is disposed, at least in its majority, forward of another gas cushion portion.

6. The second movable seal of claim 5 wherein said second movable seal can be, at least in part, removed, with the boat hull waterborne, by on-board personnel through a second hull opening, with said second hull opening, positioned, at least partially, aft of the forward seal.

7. The hull of claim 1 which further includes a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width.

8. The substantially rigid aft seal member of claim 7 wherein said substantially rigid aft seal member includes, at least in part, lower sealing surfaces that are substantially more horizontal, as viewed in a vertical transverse plane of the hull, than said substantially rigid aft seal member's surfaces proximal to and forward of said lower sealing surfaces.

9. The substantially rigid aft seal member of claim 7 wherein said lower sealing surfaces, when viewed from below the hull, include, at least in part, a V-shaped section.

10. The substantially rigid aft seal member of claim 7 wherein said lower sealing surfaces, when viewed from below the hull, include, at least in part, a W-shaped section.

11. The hull claim 7 which further includes at least one movable aft seal member where said movable aft seal member is positioned proximal said substantially rigid aft seal member.

12. The movable aft seal member of claim 11 wherein said movable aft seal member is mechanically actuated.

13. The movable seal member of claim 11 wherein said movable aft seal member is resiliently biased.

14. The movable aft seal member of claim 11 wherein said movable aft seal member contains surfaces on its underside that are, at least in part, angled to horizontal when viewed in a vertical transverse plane of the hull.

15. The hull of claim 1 which further includes a forwardly extending bow member that is disposed, at least in part, forward of said forward movable seal.

16. The hull of claim 1 which further includes a divider member that passes through said forward movable seal.

17. The divider of claim 16 wherein said divider member is at least partially, hollowed out over portions of its underside.

18. The divider member of claim 16 wherein said divider member is in mechanical communication with the forwardly extending bow member.

19. The hull of claim 1 which further includes openings that penetrate through from inside to outside of the sidehulls and that are disposed, at least in part, forward of the forward movable seal.

20. The hull of claim 1 which further includes a bow shaped member positioned aft of the forward movable seal and forward of the substantially rigid aft seal member.

21. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a forward movable seal, and with sidehulls that extend over at least a portion of a length of said hull, the improvement comprising:

a second movable seal disposed aft of said forward movable seal, said forward movable seal and said second movable seal forming part of a boundary of a forward gas cushion portion where said forward gas cushion portion is disposed, at least in its majority, forward of another gas cushion portion, and where inside surfaces of at least one of said sidehulls are substantially parallel proximal at least one of said movable seals and said inside surfaces diverge aft of at least one of said movable seals.

22. The hull of claim 21 wherein said sidehulls, outward of said inside surfaces and proximal said forward movable seal, have lower surfaces that are substantially more horizontal, as viewed in a vertical transverse plane of the hull, than an average angle of sidehull surfaces that are outward of said lower surface.

23. The hull of claim 22 wherein said lower surfaces are positioned, at least in part, within a boundary formed by sidehull inner and outer keels.

24. The hull of claim 21, wherein said forward movable seal can be removed, at least in part, by on-board personnel through a hull opening disposed, at least in part, directly forward of said forward movable seal and wherein there is hull structure proximal to and, at least in part, directly forward of said hull opening.

25. The second movable seal of claim 21 wherein said seal can be, at least in part, removed, with the boat hull waterborne, by on-board personnel through a second hull opening, with said second hull openings, positioned, at least partially, aft of the forward movable seal.

26. The second movable seal of claim 21 wherein said second movable seal includes a mechanical fastener whereby said mechanical fastener slides into a track where said track is in mechanical communication with the hull and extends over a length of a rear portion of said movable seal.

27. The hull of claim 21 which further includes a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width.

28. The substantially rigid aft seal member of claim 27 wherein said substantially rigid aft seal member includes, at least in part, lower sealing surfaces that are substantially more horizontal, as viewed in a vertical transverse plane of the hull, than said substantially rigid aft seal member's surfaces proximal to and forward of said lower sealing surfaces.

29. The substantially rigid aft seal member of claim 27 wherein said lower sealing surface, when viewed from below the hull, includes, at least in part, a V-shaped section.

30. The substantially rigid aft seal member of claim 27 wherein said lower sealing surface, when viewed from below the hull, includes, at least in part a W-shaped section.

31. The hull of claim 27 which further includes at least one movable aft seal member where said movable aft seal member is positioned proximal said substantially rigid aft seal member.

32. The hull of claim 21 which further includes a forwardly extending bow member that is disposed, at least in part, forward of said forward movable seal.

33. The hull of claim 21 which further includes a divider member that passes through said forward movable seal.

34. The hull of claim 33 wherein said divider member is, at least partially, hollowed out over portions of its underside.

35. The divider member of claim 33 wherein said divider member is in mechanical communication with a forwardly extending bow member.

36. The hull of claim 21 which further includes openings that penetrate through from inside to outside of the sidehulls and that are disposed, at least in part, forward of the forward movable seal.

37. The hull of claim 21 which further includes a bow shaped member positioned aft of the forward movable seal and forward of the substantially rigid aft seal member.

38. The hull of claim 21 which further includes a third movable seal disposed aft of said second movable seal.

39. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a forward seal substantially moveable with respect to said hull, and with sidehulls that extend over at least a portion of a length of said hull, the improvement comprising:

a second movable seal disposed aft of said forward movable seal dividing said gas cushion into at least two substantially separate portions, said separate portions can be supplied with gas at different pressures, and a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width.

40. The second movable seal of claim 39 wherein said second movable seal can be, at least in part, removed, with the hull waterborne, by on-board personnel through a hull opening, with said hull opening positioned, at least partially, aft of the forward movable seal.

41. The second movable seal of claim 39 wherein said second movable seal includes a mechanical fastener with said mechanical fastener sliding into a track where said track is in mechanical communication with the hull and extends over a length of a rear portion of said movable seal.

42. The improved hull of claim 39 wherein said substantially rigid aft seal member includes, at least in part, lower sealing surfaces that are substantially more horizontal, as viewed in a vertical transverse plane of the hull, than said substantially rigid aft seal member's surfaces proximal to and forward of said lower sealing surfaces.

43. The substantially rigid aft seal member of claim 39 wherein said lower sealing surface, when viewed from below the hull, includes, at least in part, a V-shaped section.

44. The substantially rigid aft seal member of claim 39 wherein said lower sealing surface, when viewed from below the hull, includes, at least in part, a W-shaped section.

45. The hull of claim 39 which further includes at least one movable aft seal member where said movable aft seal member is positioned proximal said substantially rigid aft seal member.

46. The movable aft seal member of claim 45 wherein said movable aft seal member is mechanically actuated.

47. The movable aft seal member of claim 45 wherein said movable aft seal member is resiliently biased.

48. The movable aft seal member of claim 45 wherein said movable aft seal member contains surfaces on its underside that are, at least in part, angled to horizontal when viewed in a vertical transverse plane of the hull.

49. The hull of claim 39 which further includes a forwardly extending bow member that is disposed, at least in part, forward of said forward movable seal.

50. The hull of claim 39 which further includes a divider member that passes through said forward movable seal.

51. The divider member of claim 50 wherein said divider member is, at least partially, hollowed out over portions of its underside.

52. The divider member of claim 50 wherein said divider member is in mechanical communication with the forwardly extending bow member.

53. The hull of claim 39 which further includes openings that penetrate through from inside to outside of the sidehulls and that are disposed, at least in part, forward of the forward movable seal.

54. The hull of claim 39 which further includes a bow shaped member positioned aft of the forward movable seal and forward of the substantially rigid aft seal member.

55. The hull of claim 39 which further includes a third movable seal disposed aft of said second movable seal.

56. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, and with a forward portion of said gas cushion restrained, at least partially, by a forward movable seal, the improvement comprising:

a second movable seal positioned aft of said forward movable seal, said second movable seal can be, at least in part, removed, with the hull waterborne, by on-board personnel through a hull opening, with said hull opening positioned, at least partially, aft of the forward movable seal.

57. The hull of claim 56 wherein said forward movable seal can be removed, at least in part, by on-board personnel through a forward hull opening disposed, at least in part, directly forward of said forward movable seal and wherein there is hull structure proximal to and, at least in part, directly forward of said forward hull opening.

58. The second movable seal of claim 56 wherein said second movable seal includes a mechanical fastener whereby said mechanical fastener slides into a track where said track is in mechanical communication with the hull and extends over a length of a rear portion of said movable seal.

59. The hull of claim 56 which further includes a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width.

60. The hull of claim 56 which further includes a forwardly extending bow member that is disposed, at least in part, forward of said forward movable seal.

61. The hull of claim 56 wherein there is a third movable seal positioned aft of the second movable seal.

62. In an improved hull having a recess in its underside, said recess being pressurized with gas supplied by artificial means to create a restrained gas cushion between portions of the the hull and a water surface, wherein said gas cushion is of sufficient pressure to support a significant portion of a weight of said hull, with a forward portion of said gas cushion restrained, at least partially, by a movable seal, the improvement comprising:

a mechanical fastener on an element of the movable seal whereby said mechanical fastener slides into a track where said track is in mechanical communication with the hull and extends over a length of a rear portion of said movable seal, and wherein said movable seal may be removed, with the hull waterborne, by on-board personnel, through a hull opening, with said hull opening at least partially disposed in a portion of a hull that extends forwardly of said movable seal and wherein there is hull structure proximal to and, at least in part, directly forward of said hull opening.

63. The hull of claim 62 which further includes a second movable seal, said second movable seal and the movable seal form part of a boundary of a gas cushion portion where said gas cushion portion is disposed, at least in its majority, forward of another gas cushion portion.

64. The hull of claim 62 which further includes a third movable seal disposed aft of said second movable seal.

65. The hull of claim 62 which further includes a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width.

66. The hull of claim 62 which further includes a forwardly extending bow member that is disposed, at least in part, forward of said forward movable seal.

67. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least in part, by a forward seal substantially moveable with respect to said hull, and with sidehulls that extend over at least a portion of a length of said hull, the improvement comprising:

a substantially rigid aft seal member wherein said substantially rigid aft seal member extends over a majority of recess width and said substantially rigid aft seal member's underside, when viewed in at least one vertical transverse plane of the hull, includes, at least in part, lower sealing surfaces that are, at least in part, substantially more horizontal, as viewed in a vertical transverse plane of the hull, than said substantially rigid aft seal member's underside surfaces proximal to and forward of said lower sealing surfaces.

68. The substantially rigid aft seal member of claim 67 wherein said lower sealing surface, when viewed from below the hull, includes, at least in part, a V-shaped section.

69. The substantially rigid aft seal member of claim 67 wherein said lower sealing surface, when viewed from below the hull, includes, at least in part, a W-shaped section.

70. The hull of claim 67 which further includes at least one movable portion of a gas cushion aft seal member where said movable aft seal member is positioned proximal said substantially rigid aft seal member.

71. The movable aft seal member of claim 70 wherein said movable aft seal member is mechanically actuated.

72. The movable aft seal member of claim 70 wherein said movable aft seal member is resiliently biased.

73. The movable aft seal member of claim 70 wherein said movable aft seal member contains surfaces on its underside that are, at least in part, angled to horizontal when viewed in a vertical transverse plane of the hull.

74. The hull of claim 67 which further includes a forwardly extending bow member that is disposed, at least in part, forward of said forward movable seal.

75. The hull of claim 67 which further includes a divider member that passes through said forward movable seal.

76. The divider member of claim 75 wherein said divider member is, at least in partially, hollowed out over portions of its underside.

77. The divider member of claim 75 wherein said divider member is in mechanical communication with a forwardly extending bow member.

78. The hull of claim 67 which further includes openings that penetrate through from inside to outside of the sidehulls and that are disposed, at least in part, forward of the forward movable seal.

79. The hull of claim 67 which further includes a bow shaped member positioned aft of the forward movable seal and forward of said substantially rigid aft seal member.

80. The hull of claim 67 wherein said sidehulls have inside surfaces that are substantially parallel over at least part of their forward portions that are proximal the forward movable seal, said sidehull inside surfaces expand outwardly, at least in part, aft of said parallel inside surfaces.

81. The hull of claim 80 wherein sidehulls, outward of said parallel inside surfaces proximal said forward movable seal, have lower surfaces that are substantially more horizontal, as viewed in a vertical transverse plane of the hull, than an average angle of sidehull surfaces that are outward of said lower surfaces.

82. The hull of claim 81 with said sidewalls having lower surfaces that are positioned, at least in part, within a boundary formed by sidehull inner and outer keels.

83. The hull of claim 67 wherein said forward movable seal can be removed, at least in part, by on-board personnel through a hull opening disposed, at least in part, directly forward of said forward seal and wherein there is hull structure proximal to and, at least in part, directly forward of said hull opening.

84. The forward movable seal of claim 67 wherein said seal includes a mechanical fastener whereby said mechanical fastener slides into at rack where said track is in mechanical communication with the hull and extends over a length of a rear portion of said seal.

85. The hull of claim 67 which further includes a second movable seal disposed aft of said forward seal, said forward movable seal and said second movable seal form part of a boundary of a forward gas cushion portion where said forward gas cushion portion is disposed, at least in its majority, forward of another gas cushion portion.

86. The second movable seal of claim 85 wherein said second movable seal can be, at least in part, removed, with the boat hull waterborne, by on-board personnel through a second hull opening, with said second hull opening positioned, at least partially, aft of the forward seal.

87. The hull of claim 85 which further includes a third movable seal disposed aft of said second seal.

88. The substantially rigid aft seal member of claim 67 wherein said lower sealing surfaces includes a step.

89. The step of claim 88 wherein said step is supplied with gas from the gas cushion.

90. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a forward seal substantially moveable with respect to said hull, and with sidehulls that extend over at least a portion of a length of said hull, the improvement comprising:

a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said aft seal member's width, and at least one movable aft seal member where said movable aft seal member is positioned proximal said substantially rigid gas cushion aft seal member.

91. The movable aft seal member of claim 90 wherein said movable aft seal member is mechanically actuated.

92. The movable aft seal member of claim 90 wherein said movable aft seal member is resiliently biased.

93. The movable aft seal member of claim 90 wherein said movable aft seal member contains surfaces on its underside that are, at least in part, angled to horizontal when viewed in a vertical transverse plane of the hull.

94. The hull of claim 90 which further includes a forwardly extending bow member that is disposed, at least in part, forward of said forward movable seal.

95. The hull of claim 90 which further includes a divider member that passes through said forward movable seal.

96. The divider member of claim 95 wherein said divider member is, at least partially, hollowed out over portions of its underside.

97. The divider member of claim 95 wherein said divider member is in mechanical communication with a forwardly extending bow member.

98. The hull of claim 90 which further includes openings that penetrate through from inside to outside of the sidehull and that are disposed, at least in part, forward of the forward movable seal.

99. The hull of claim 90 which further includes a bow shaped member positioned aft of the forward movable seal and forward of a stern of the hull.

100. The hull of claim 90 wherein said sidehulls have inside surfaces that are substantially parallel over at least part of their forward portions that are proximal the forward movable seal, said sidehull inside surfaces expand outwardly, at least in part, aft of said parallel inside surfaces.

101. The hull of claim 90 wherein sidehulls, outward of said inside surfaces and proximal said forward movable seal, have lower surfaces that are substantially more horizontal, as viewed in a vertical transverse plane of the hull, than an average angle of sidehull surfaces that are outward of said lower surfaces.

102. The hull of claim 101 wherein said lower surfaces are positioned, at least in part, within a boundary formed by sidehull inner and outer keels.

103. The hull of claim 90 wherein said forward movable seal can be removed, at least in part, by on-board personnel through a hull opening disposed at least in part, directly forward of said forward seal and wherein there is hull structure proximal to and, at least in part, directly forward of said hull opening.

104. The forward movable seal of claim 90 wherein said forward movable seal includes a mechanical fastener whereby said mechanical fastener slides into a track where said track is in mechanical communication with the hull and extends over a length of a rear portion of said forward movable seal.

105. The hull of claim 90 which further includes a second movable seal disposed aft of said forward movable seal, said second movable seal and the forward movable seal forming part of a boundary of a forward gas cushion portion where said forward gas cushion portion is disposed, at least in its majority, forward of another gas cushion portion.

106. The second movable seal of claim 105 wherein said second movable seal can be, at least in part, removed, with the hull waterborne, by on-board personnel through a second hull opening, with said second hull opening positioned, at least partially, aft of the forward seal.

107. The hull of claim 105 which further includes a third movable seal disposed aft of said second movable seal.

108. The hull of claim 90 wherein said substantially rigid aft seal member's underside, when viewed in at least one vertical transverse plane of the hull, includes, at least in part, lower sealing surfaces that are substantially more horizontal, as viewed in a vertical transverse plane of the hull, than said substantially rigid aft seal member surfaces proximal to and forward of said lower sealing surfaces.

109. The substantially rigid aft seal member of claim 108 wherein said lower sealing surface includes a step.

110. The step of claim 109 wherein said step is supplied with gas from the gas cushion.

111. The substantially rigid aft seal member of claim 90 wherein said lower sealing surface, when viewed from below the hull, includes, at least in part, a V-shaped section.

112. The substantially rigid aft seal member of claim 90 wherein said lower sealing surface, when viewed from below the hull, includes, at least in part, a W-shaped section.

113. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a forward seal substantially moveable with respect to said hull, and with sidehulls that extend over at least a portion of a length of said hull, the improvement comprising:

a forwardly extending bow member disposed, at least in part, forward of said forward movable seal, and said gas cushion is divided into at least two substantially separate portions by a second seal substantially moveable with respect to said hull disposed aft of the forward movable seal forward seal substantially moveable with respect to said hull.

114. The hull of claim 113 which further includes a divider member that passes through said forward movable seal.

115. The divider member of claim 114 wherein said divider member is, at least partially, hollowed out over portions of its underside.

116. The divider member of claim 114 wherein said divider member is in mechanical communication with said forwardly extending bow member.

117. The divider member of claim 114 wherein said divider member has substantially parallel sides where it passes between elements of the forward movable seal.

118. The hull of claim 113 which further includes a bow shaped member positioned aft of the forward movable seal and forward of a substantially rigid aft seal member.

119. The hull of claim 113 wherein said sidehulls have inside surfaces that are substantially parallel over at least part of their forward portions that are proximal the forward movable seal, said sidehull inside surfaces expand outwardly, at least in part, aft of said parallel inside surfaces.

120. The hull of claim 119 wherein said sidehulls, outward of said parallel inside surfaces proximal said forward movable seal, have lower surfaces that are substantially more horizontal, as viewed in a vertical transverse plane of the hull, than an average angle of sidehull surfaces that are outward of said lower surfaces.

121. The hull of claim 120 with said sidehulls having lower surfaces are positioned, at least in part, within a boundary formed by sidehull inner and outer keels.

122. The second movable seal of claim 113 wherein said movable seal can be, at least in part, removed, with the hull waterborne, by on-board personnel through a second hull opening, with said second hull opening positioned, at least partially, aft of the forward seal.

123. The hull of claim 113 which further includes a third movable seal disposed aft of said second movable seal.

124. The hull of claim 113 which further includes a substantially rigid aft seal member wherein said substantially rigid aft seal member's underside, when viewed in at least one vertical transverse plane of the hull, contains surfaces that are angled to horizontal over a majority of said substantially rigid aft seal member's width.

125. The hull of claim 124 wherein said substantially rigid aft seal member's underside, when viewed in at least one vertical transverse plane of the hull, includes, at least in part, lower sealing surfaces that are substantially more horizontal, as viewed in a vertical transverse plane of the hull, than substantially rigid aft seal member's surfaces proximal to and forward of said lower sealing surfaces.

126. The hull of claim 124 wherein there is included at least one movable aft seal member where said movable portion of said aft seal member is positioned proximal said substantially rigid aft seal member.

127. In an improved hull having a recess in its underside, said recess being pressurized with gas supplied by artificial means to create a restrained gas cushion between portions of the hull and a water surface, wherein said gas cushion is of sufficient pressure to support a significant portion of a weight of said hull, with a forward portion of said gas cushion restrained, at least partially, by a and in the forward portion of said hull, and with sidehulls that extend over at least a portion of a length of said hull, the improvement comprising;
  a substantially rigid aft seal member wherein said substantially rigid aft seal member extends over a majority of recess width and said substantially rigid aft seal member's underside, when viewed in at least one vertical transverse plane of the hull, contains surfaces that are angled to horizontal over a majority of said substantially rigid aft seal member's width, and said substantially rigid aft seal member's underside, when viewed from below the hull, includes, at least in part, a V-shaped section.

128. The hull of claim 127 wherein said substantially rigid aft seal member's underside, when viewed from below the hull, includes, at least in part, a W-shaped section.

129. The hull of claim 127 which further includes a movable aft seal member where said movable aft seal member is positioned proximal said substantially rigid aft seal member.

130. The movable aft seal member of claim 129 wherein said movable aft seal member is mechanically actuated.

131. The movable aft seal member of claim 129 wherein said movable aft seal member is resiliently biased.

132. The movable aft seal member of claim 129 wherein said movable portion contains surfaces on its underside that are, at least in part, angled to horizontal when viewed in a vertical transverse plane of the hull.

133. The hull of claim 127 which further includes a forwardly extending bow member that is disposed, at least in part, forward of said forward movable seal.

134. The hull of claim 127 which further includes a divider member that passes through said forward movable seal.

135. The divider member of claim 134 wherein said divider member is in mechanical communication with a forwardly extending bow member.

136. The hull of claim 127 which further includes openings that penetrate through from inside to outside of the sidehulls and that are disposed, at least in part, forward of the forward movable seal.

137. The hull of claim 127 wherein said sidehulls have inside surfaces that are substantially parallel over at least part of their forward portions that are proximal the forward movable seal, said sidehull inside surfaces expand outwardly, at least in part, aft of said parallel inside surfaces.

138. The hull of claim 137 wherein said sidehulls, outward of said parallel inside surfaces proximal said forward movable seal, have lower surfaces that are substantially more horizontal, as viewed in a vertical transverse plane of the hull, than an average angle of sidehull surfaces that are outward of said lower surfaces.

139. The hull of claim 138 wherein said lower surfaces are positioned, at least in part, within a boundary formed by sidehull inner and outer keels.

140. The hull of claim 127 wherein said forward movable seal can be removed, at least in part, directly forward of said forward movable seal and wherein there is hull structure proximal to and, at least in part, directly forward of said seal removal hull opening.

141. The hull of claim 127 which further includes a second movable seal disposed aft of said forward movable seal.

142. The hull of claim 141 wherein said second movable seal can be, at least in part, removed, with the hull waterborne, through a second hull opening by on-board personnel.

* * * * *